(12) United States Patent
Demmer et al.

(10) Patent No.: US 6,287,461 B1
(45) Date of Patent: Sep. 11, 2001

(54) TANDEM SYSTEM FOR ADSORPTIVE SEPARATION

(75) Inventors: Wolfgang Demmer; Dietmar Nussbaumer; Abdul Weiss, all of Göttingen (DE)

(73) Assignee: Sartorius AG (DE)

( * ) Notice: Subject to any disclaimer, the term of this patent is extended or adjusted under 35 U.S.C. 154(b) by 0 days.

(21) Appl. No.: 09/397,457

(22) Filed: Sep. 16, 1999

(51) Int. Cl.$^7$ ................................................. B01D 15/00
(52) U.S. Cl. ....................... 210/143; 210/257.1; 210/264; 210/269; 210/284
(58) Field of Search ..................................... 210/676, 677, 210/257.1, 264, 269, 284, 659, 198.2, 143

(56) References Cited

U.S. PATENT DOCUMENTS

| | | | |
|---|---|---|---|
| 2,985,589 | * 5/1961 | Broughton et al. | 210/676 |
| 3,928,192 | * 12/1975 | Katzakian et al. | 210/670 |
| 4,204,952 | * 5/1980 | Snyder | 210/659 |
| 4,274,967 | 6/1981 | Snyder | 210/659 |
| 4,293,346 | * 10/1981 | Landis et al. | 210/673 |
| 4,434,051 | * 2/1984 | Golem | 210/264 |
| 4,447,329 | * 5/1984 | Broughton | 210/677 |
| 5,071,547 | 12/1991 | Cazer et al. | 210/198.2 |

* cited by examiner

*Primary Examiner*—Ivars Cintins
(74) *Attorney, Agent, or Firm*—Chernoff, Vilhuaer, McClung & Stenzel, LLP

(57) ABSTRACT

Adsorptive separation is performed on liquid media by directing the media containing a target substance through an adsorber stage A whereby the target substance is adsorbed; in the last phase of loading stage A and prior to breakthrough of the target substance in the stage A permeate, the stage A permeate is directed to a second adsorber stage B. Upon completion of the stage A loading, the target substance from stage A is eluted with buffer solution, which buffer solution is introduced to stage B, and liquid medium is directed to the preloaded stage A, while stage A is eluted so as both recover the target substance and regenerate the adsorptive capacity of stage A.

5 Claims, 6 Drawing Sheets

TANDEM SYSTEM FOR ADSORPTIVE SEPARATION

Pursuant to 35 USC §§120 and 365(b) the priority of Application Nos. PCT/EP 98/01427 filed Mar. 12, 1998 and DE 197 11 173.4 filed Mar. 18, 1997 is claimed.

BACKGROUND OF THE INVENTION

The invention concerns a method for adsorptive material separations by permeation of liquids through porous adsorbers, and an installation for carrying out the method on a process scale.

Adsorptive separation is understood in the art to mean specific separation or purification of substances (components) from a liquid phase (medium), where the substances are reversibly preferentially adsorbed by a solid adsorbent. For this purpose, a medium that contains the substances to be separated or purified is supplied to the adsorbent, or forced through it, and separated by means of one or more elution liquids (eluants) that are forced through the adsorbent under pressure. Depending upon the degree of interaction between the components of the medium and the adsorbent and eluants, the individual components are retained by the adsorbent to different degrees and thus emerge from the adsorbent in a fractionated state. The substances being separated in the medium can be adsorbed either alone or together on the adsorbent. In the latter case, the medium with the substance mixture being separated is filtered through an adsorber module until the desired substance appears at the outlet of the module. With appropriate eluants, which are, for example, filtered through the module, the target substance can be eluted from other substances retained on the adsorbent, commonly referred to as stage elution. An undesired substance or contaminant can also be separated from the medium in this manner.

Interactions between solid and liquid phases, therefore, play an important role during adsorptive material separation, in which the solid phase must exhibit a high specific surface in order to achieve high effectiveness. The solid phase should, therefore, have either a limited particle size or high porosity. Since limits are imposed on the use of extremely fine solids under practical conditions, highly porous matrices are generally used as solid phases. The use of porous matrices means that the kinetics of the fundamental process of adsorption/desorption, i.e., interaction between the components of the liquid phase and those of the solid phase, are superimposed by the kinetics of mass transport both into and out of the porous matrix. Since mass transport in known matrices occurs primarily by diffusion, for example, in particulate and porous matrices, a diffusion limitation occurs that is disadvantageous to the method's effectiveness. This is because the kinetics of the overall process are determined by the kinetics of mass transport, owing to the generally low diffusion coefficients in liquid phases. Nonparticulate matrices with continuous pore structures such as in porous membranes, on the other hand, offer the possibility of largely convective mass transport under the influence of a pressure differential. This method allows for the effective elimination of the undesired diffusion limitation.

A common way of carrying out adsorptive separation is by means of adsorption membranes, or those membranes that carry functional groups, ligands or reactants on their inner and outer surfaces that are capable of interacting with at least one substance of a liquid phase with which they come into contact. The term "adsorption membrane" is to be understood as a general term for different types of adsorption membranes, such as cationic, anionic, ligand, affinity or activated membranes, which, in turn, may be classified into different types depending upon the sorts of functional groups, ligands or reactants they possess. Porous adsorption membranes are membranes whose average pore diameter lies in the microfiltration range and is between approximately 0.1 $\mu$m and 15 $\mu$m. The thickness of the employed porous adsorption membranes is between approximately 100 $\mu$m and 500 $\mu$m.

In addition to adsorption membranes, fibrous adsorbents with adsorptive properties are also known that are formed into a flat, filter-medium-like web material. See, for example, U.S. Pat. No. 4,986,909. Adsorptive groups are applied to the fibers of this web material by surface modification. In such separations with a flat adsorbent the adsorbent is traversed by the medium. Convective transport of the liquids being treated through the adsorbent then occurs. The adsorbent, which is preferably designed as a moving endless belt, is driven at an appropriate speed, and after being traversed by the medium being filtered, is either rolled up for later treatment (rinsing, desorption, regeneration) or immediately exposed to treatment media in additional steps. A shortcoming of this method is the high mechanical stress often created on the adsorber endless belt.

Adsorbers of high binding capacity required on a process scale generally do not exhibit the sort of sharp breakthrough of the target substance achieved in small units for analytical separation purposes, especially when these adsorber units are operated in parallel in order to impart the required amount of adsorbency. This means that only part of the theoretical binding capacity of the individual units can be utilized. By "target substance" is meant that component of the medium that is reversibly bound to the adsorbent. Both useful components (product) and an interfering component (contaminant) can be involved in the separation. In addition to the required over dimensioning of the adsorber module, another shortcoming of this prior art method is that the adsorber module is not fully loaded at the time of elution, which means that the attainable concentration of target substance in the eluate is lower than theoretically possible. While the large adsorber units' drawbacks can be limited by employing a series connection of at least two units, a rigid series connection of adsorber units produces no advantages in the first phase of loading, i.e., before breakthrough of the target substance from the first stage, because the second stage is traversed only by the permeate from the first stage that is already free of target substance. Additional units, therefore, serve only to produce a pressure drop of the overall installation, without otherwise serving any useful purpose.

The basic goal of the invention is therefore to devise an improved method and installation suitable for adsorptive material separation on a process scale, in order to isolate a specified amount of target substance from a liquid medium per unit time. This goal is met by the present invention, which is summarized and described in detail below.

BRIEF SUMMARY OF THE INVENTION

According to the present invention, a tandem connection of adsorber modules is employed in lieu of a rigid series connection. The invention utilizes the fact that breakthrough of the target substance in an adsorber only occurs in the last phase of loading of the adsorbable substances, and that series connection accordingly only offers advantages in this first phase. Adsorber modules and at least two pumps are used in two identical stages A and B, wherein one stage is cyclically loaded while the other stage is eluted or regenerated, or else both stages are operated in series. Specifically, the sequence is as follows: (1) stage A is loaded; (2) before the target substance breaks through in the stage A permeate, that permeate is switched to freshly regenerated stage B; (B) as soon as stage A is fully loaded, the remaining medium is rinsed from stage A to stage B with buffer; and (4) stage B, preloaded in this fashion, is directly exposed to the medium, while stage A is eluted, so that the initial state with transposed stages is restored. Very short cycle times and, therefore, very high unit productivity can be achieved in this way, especially if membrane adsorbers are controlled with a computerized process controller.

The method and system according to the invention can be used for selective separation and purification of substances such as biospecific molecules, proteins, enzymes, ionogenic substances, and metal ions (especially heavy metal ions) from different media. The invention is primarily proposed for pilot plant and production work, and can be employed in the fields of biotechnology, genetic engineering, pharmacy, chemistry, the beverage and food industry and environmental protection.

An installation for carrying out this type of tandem method preferably uses a blocking and switching fittings so as to avoid the presence of dead, i.e., unrinsed line parts. If, for example, switching from one medium to another is to occur, this is possible, in principle, by using a T-piece with two separate blocking devices. In this way, however, an unrinsed portion of a line invariably remains, from which the subsequent medium is contaminated by the preceding one. The Marc Valve Corporation of Tewksbury, Mass. has a commercially available system of membrane valves that combines in a single unit a number of functions (up to 6 inputs with a bypass valve and valve for flow reversal) and that has negligible dead volume. These or similar fittings are preferred.

DETAILED DESCRIPTION OF PREFERRED EMBODIMENTS

Figure 1:
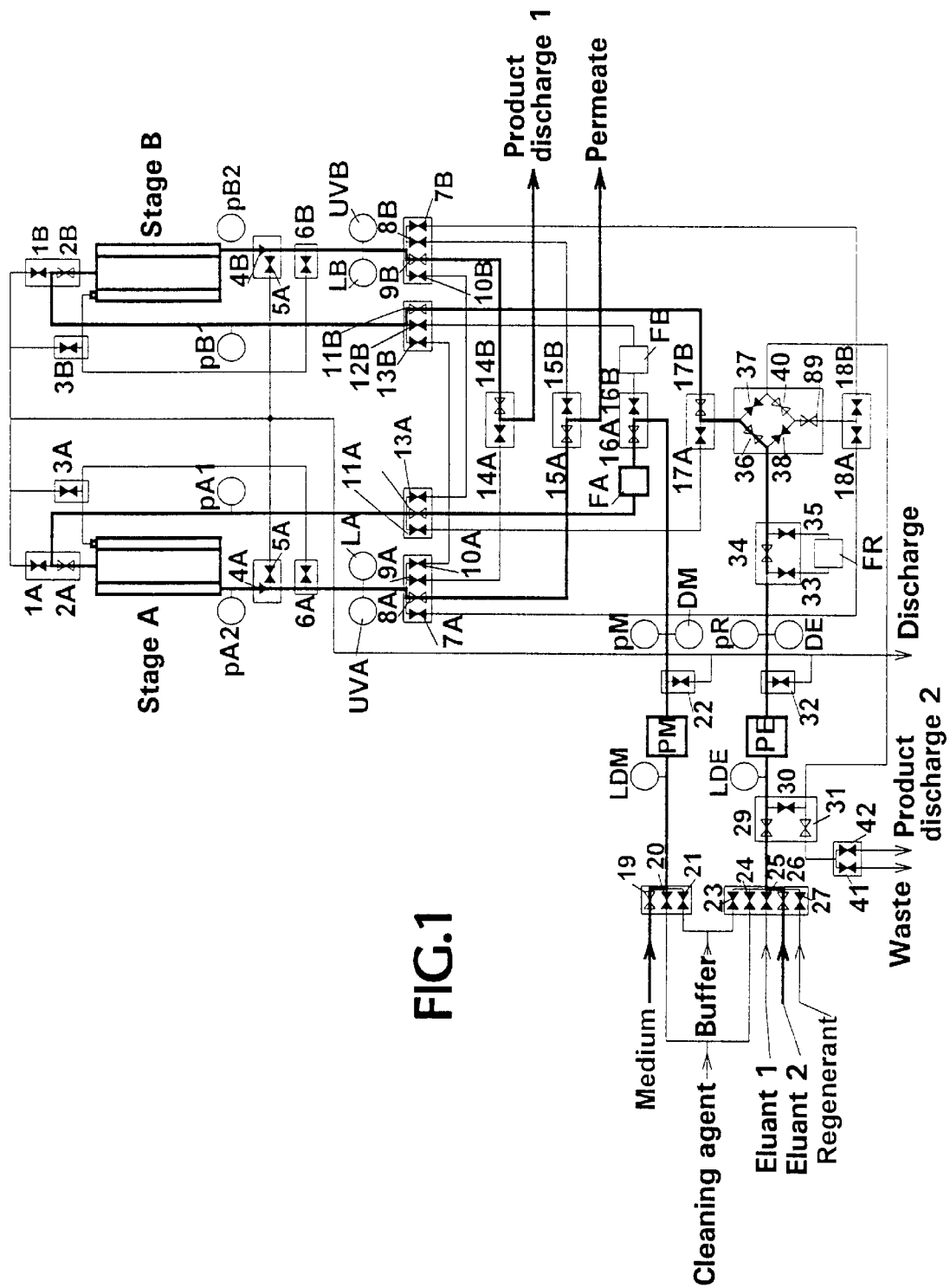
FIG. 1 is a schematic of a flowchart of an exemplary tandem unit in operation wherein stage A is exposed to the medium, while product is eluted from stage B.

FIGS. 1–5 show a tandem unit having stages A and B, which are identical adsorber units, consisting either of a single module or of individual modules or columns connected in parallel or series wherein pA1, pA2, pB1, pB2, pM, and pR are pressure measurement devices; UVA and UVB are monitors to determine UV extinction coefficients; LA and LB are conductivity monitors; LDM and LDE are air detectors (to protect the pumps from running dry); PM and PE are pumps; and FA, FB, and FR denote prefilter units. Reference numerals 1–42 denote individual on-off functions of the valves, wherein valve functions having identical tasks have the same numbers in both stages and are distinguished by the addition of A or B to denote the particular stage. Valve functions 29–31 and 33–35 are bypass valves; valve functions 4A and 4B are back-pressure valves; valve functions 5A, 5B, 22 and 32 are drainage valves; valve functions 1A, 1B, 3A and 3D control venting; and valves 6A and 6B serve to open a bypass from the venting unit of the module. Valve functions 36–40 control flow reversal. Bold-faced valve symbols signify that the valve is closed, while non-boldfaced valve symbols signify that the valve is open. Heavy dark lines signify lines through which liquids are conveyed.

FIG. 1 shows an exemplary installation of the invention in an operational mode, wherein stage A is exposed to the treated medium, while the product is eluted from stage B.

Figure 2:
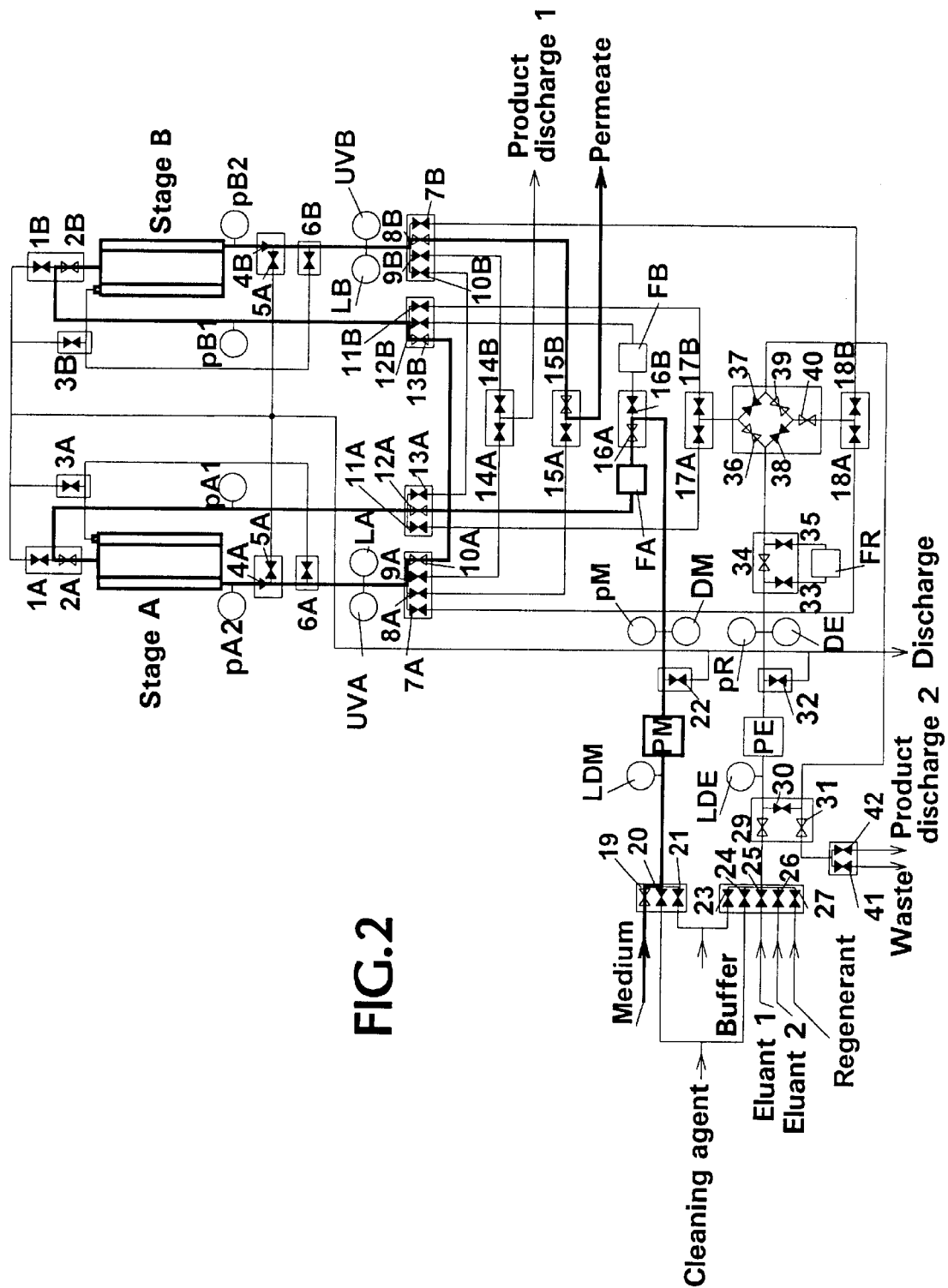
FIG. 2 is a schematic flowchart of the unit shown in FIG. 1 during loading stages A and B with medium in series connection.

FIG. 2 shows loading of stages A and B with a medium in series connection. This method involves a variant for two-stage elution, wherein a bound contaminant is eluted after loading first with eluant 1, and then the product is eluted with eluant 2.

In the flowcharts comprising FIGS. 3–6, additional embodiments of the invention are depicted, demonstrating the wide variety of separation approaches attainable with their respective proposed valve layouts. One of ordinary skill in the art may readily determine which fittings are superfluous in simpler applications.

Figure 3:
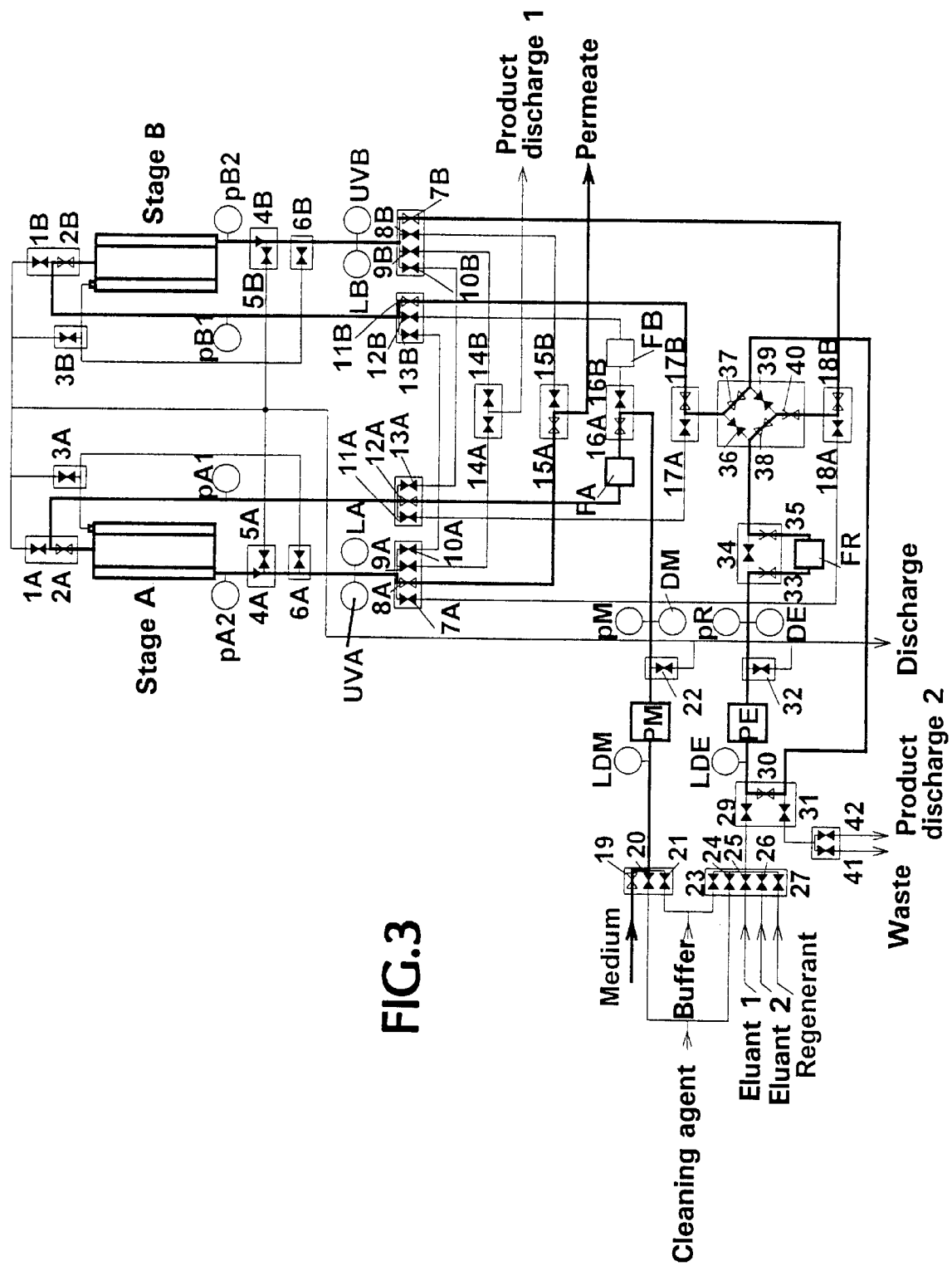
FIG. 3 shows the unit of FIG. 1 during loading stage A with medium and regeneration of stage B in a closed loop and with backflushing.
Figure 4:
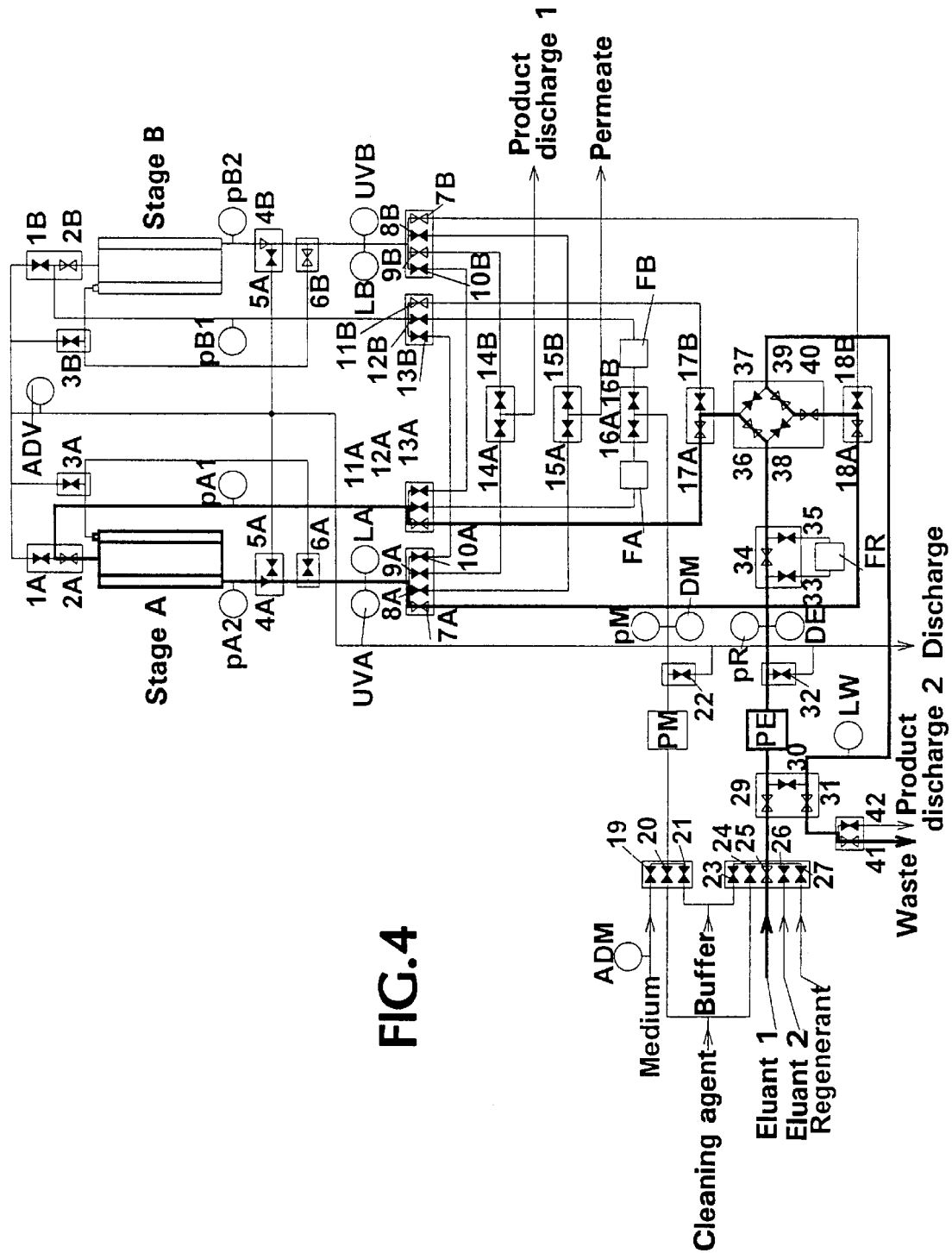
FIG. 4 shows the unit of FIG. 1 during elution of a contaminant with eluant.
Figure 5:
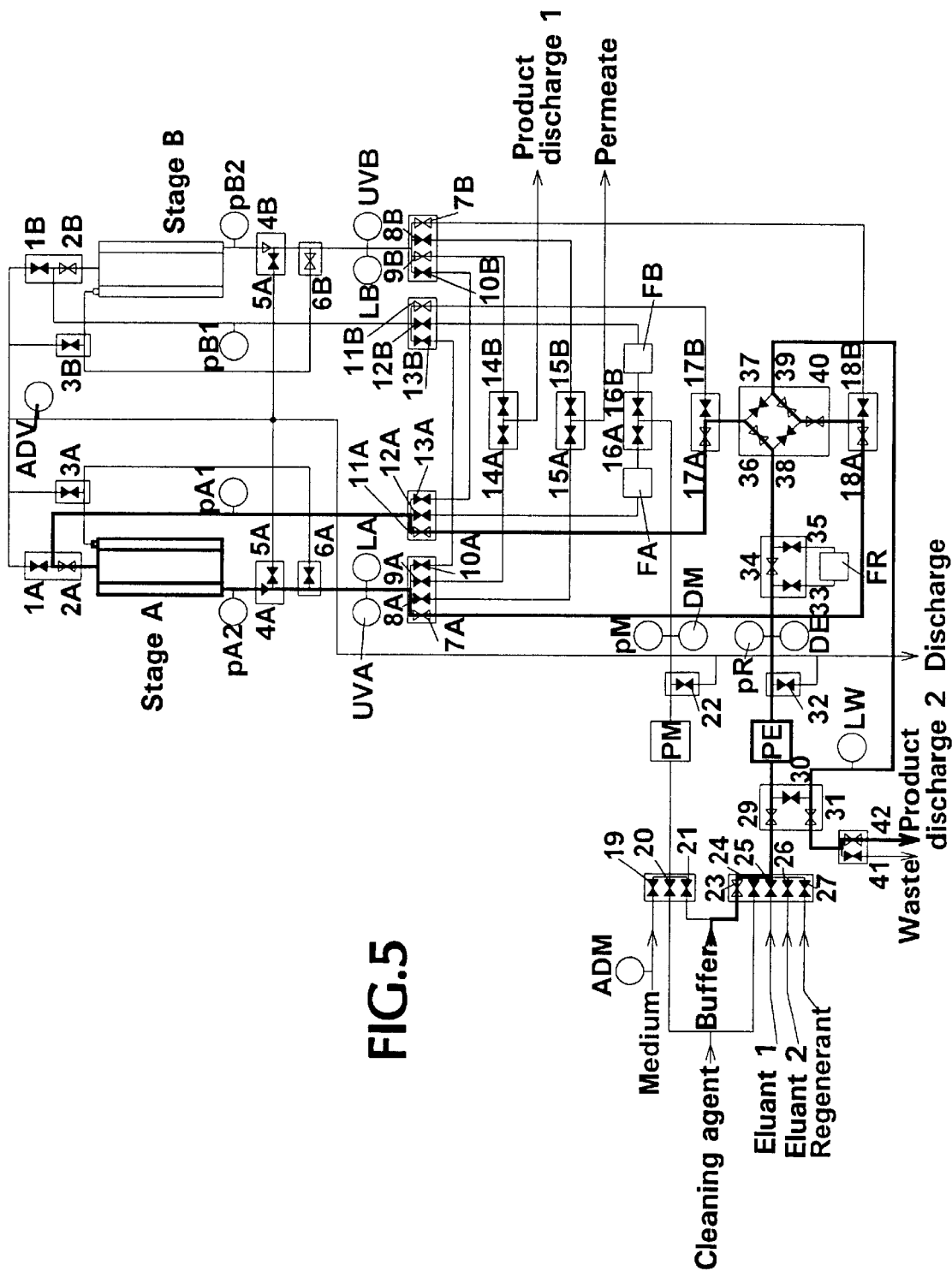
FIG. 5 shows the unit of FIG. 1 during recovery of a product that was eluted beforehand with a circulating eluant by rinsing the circulation line with buffer.

While stage A is exposed to the treated medium in FIG. 3, regeneration in a closed loop and with back flushing occurs in stage B. The regenerant filter, the bypass of which is closed to all other liquids, is connected into the loop, so that particulate contaminants potentially released by the adsorber cannot be redeposited. The circuit of the tandem unit is shown in FIG. 4, wherein elution of a contaminant occurs in stage A with eluant 1. FIG. 5 shows operation of the tandem unit wherein recovery of product occurs in stage A, the product having been eluted with a circulating eluant by rinsing the circulation line with a buffer solution.

Figure 6:
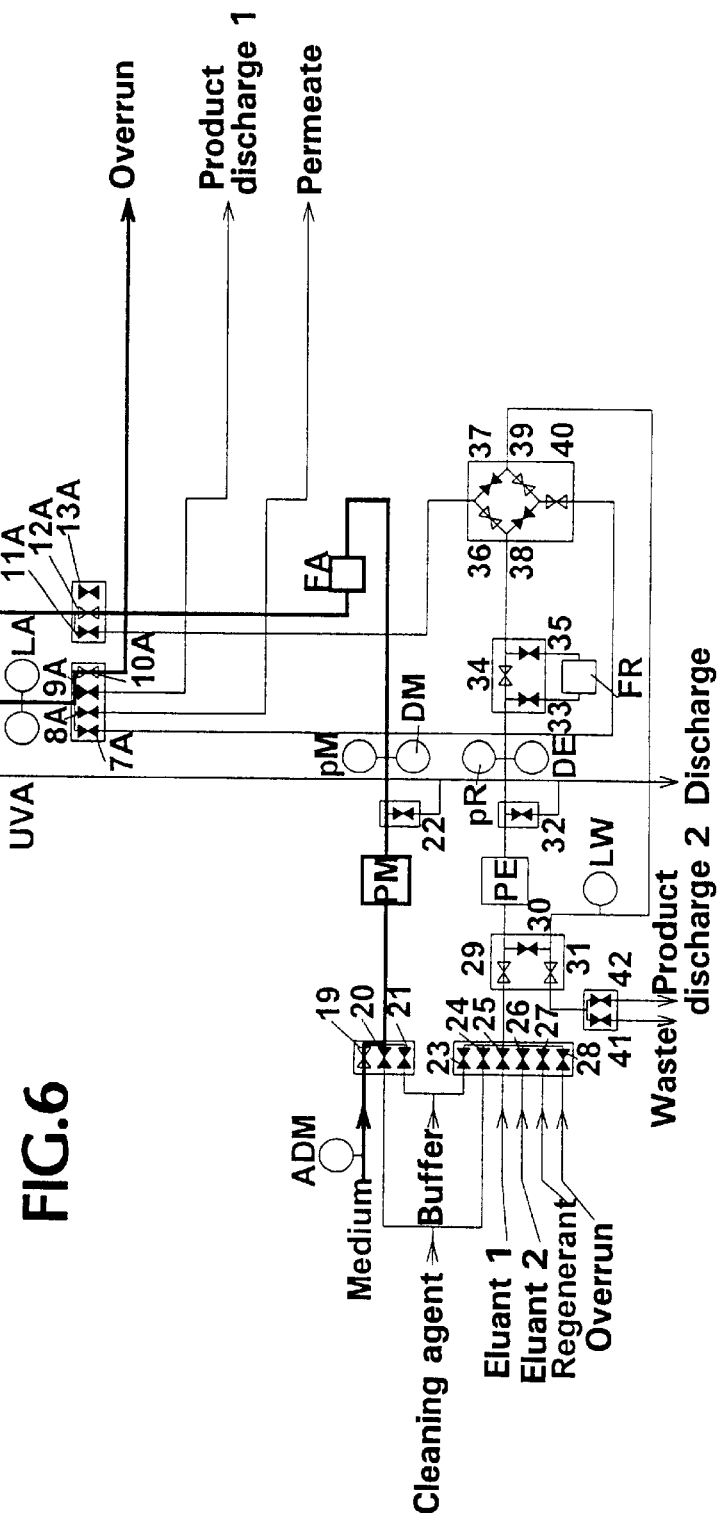
FIG. 6 shows an exemplary tandem unit according to the invention with a single stage.

It is also possible according to the invention to utilize the advantages of the tandem principle in the presence of only one adsorber stage. For this purpose, a switch is made to a surge tank before breakthrough of the target substance, and the stage is then loaded by means of pump PE after elution with the permeate collected in the surge tank. FIG. 6 shows the application of this tandem principle to a single stage wherein the permeate collected in the surge tank is referred to as "overrun."

The terms and expressions which have been employed in the forgoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. Apparatus for adsorptive separations by permeation of liquids through porous adsorbers, comprising:
   (a) porous adsorber stage A means for adsorbing a target substance from a liquid medium;
   (b) porous adsorber stage B means for adsorbing a target substance from a liquid medium;
   (c) at least two pumps, one of which is in fluid communication with adsorber stage A and one of which is in fluid communication with adsorber stage B, but which are not in fluid communication with each other;

(d) means for partially loading adsorber stage A with liquid medium containing a target substance by directing said liquid medium through said adsorber stage A, said means thereby forming a stage A permeate containing said target substance;

(e) means for diverting said stage A permeate to a second, freshly regenerated adsorber stage B, said diverting taking place prior to breakthrough of said target substance in said liquid medium containing said stage A permeate;

(f) means for both (1) rinsing said target substance from stage A with a buffer solution and for (2) simultaneously introducing said buffer solution containing said target substance into said adsorber stage B; and (g) means for both (1) loading said adsorber stage B with said liquid medium and for (2) simultaneously passing an elution solution through said adsorber stage A, said means thereby causing elution of said target substance and regeneration of the adsorptive capacity of adsorber stage A.

2. Apparatus of claim 1, including a surge tank for receiving said adsorber stage A permeate and said buffer solution and for reloading said adsorber stage A.

3. Apparatus of claim 1 or 2 including a process controller.

4. Apparatus of claim 1 or 2 wherein adsorber stages A and B each comprise an adsorber module selected from the group consisting of a single adsorber module, multiple adsorber modules, and adsorber columns connected in parallel.

5. Apparatus of claim 1 or 2 wherein adsorber stages A and B each comprise an adsorber module selected from the group consisting of a single adsorber module, multiple adsorber modules, and adsorber columns connected in series.

* * * * *